US012720230B2

(12) United States Patent
Kim

(10) Patent No.: US 12,720,230 B2
(45) Date of Patent: Aug. 25, 2026

(54) IMAGE PROCESSING DEVICE AND METHOD OF OPERATION THEREOF

(71) Applicant: SAMSUNG ELECTRONICS CO., LTD., Suwon-si (KR)

(72) Inventor: Ilho Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 9 days.

(21) Appl. No.: 18/791,997

(22) Filed: Aug. 1, 2024

(65) Prior Publication Data

US 2025/0047997 A1 Feb. 6, 2025

(30) Foreign Application Priority Data

Aug. 3, 2023 (KR) ........................ 10-2023-0101790

(51) Int. Cl.
*H04N 25/71* (2023.01)
*H04N 5/06* (2006.01)
*H04N 25/701* (2023.01)

(52) U.S. Cl.
CPC ............. *H04N 25/745* (2023.01); *H04N 5/06* (2013.01); *H04N 25/701* (2023.01)

(58) Field of Classification Search
CPC ...... H04N 25/745; H04N 25/701; H04N 5/06; H04N 5/232; H04N 5/378
USPC .......................................................... 348/308
See application file for complete search history.

(56) References Cited

U.S. PATENT DOCUMENTS

| | | | | |
|---|---|---|---|---|
| 9,749,548 | B2 | 8/2017 | Zhu et al. | |
| 10,362,267 | B2 | 7/2019 | Cha et al. | |
| 10,922,781 | B1 | 2/2021 | Singh et al. | |
| 11,076,092 | B2 | 7/2021 | Hada et al. | |
| 11,514,552 | B2 | 11/2022 | Cha et al. | |
| 11,630,701 | B2 | 4/2023 | Nandan et al. | |
| 2011/0242355 | A1 | 10/2011 | Goma et al. | |
| 2015/0002665 | A1 * | 1/2015 | Sentinelli .............. | H04N 7/188 382/103 |

FOREIGN PATENT DOCUMENTS

| | | | |
|---|---|---|---|
| JP | H09252391 | * | 9/1997 |
| JP | 2018-156414 | A | 10/2018 |
| KR | 10-2021-0150704 | A | 12/2021 |

OTHER PUBLICATIONS

Yusuke Monno et al., "Adaptive Residual Interpolation for Color and Multispectral Image Demosaicking", Sensors, vol. 17, No. 12, Article No. 2787, Dec. 2017, 21 pages, DOI: 10.3390/s17122787.

* cited by examiner

*Primary Examiner* — Joel W Fosselman
(74) *Attorney, Agent, or Firm* — Sughrue Mion, PLLC

(57) ABSTRACT

A method of operating a line buffer controller includes receiving pieces of line image data included in an image frame, and, when all pieces of line image data included in the image frame are received, performing a drain operation on the image frame based on a maximum standby count of the image frame.

18 Claims, 13 Drawing Sheets

FRM1
CH1
FRM2
CH2
FRM3
CH3
...
100
LIC
STRIN
200
ISPCR
PLC
M1
M2
M3
LBC(300)
...
STROUT

FIG. 3

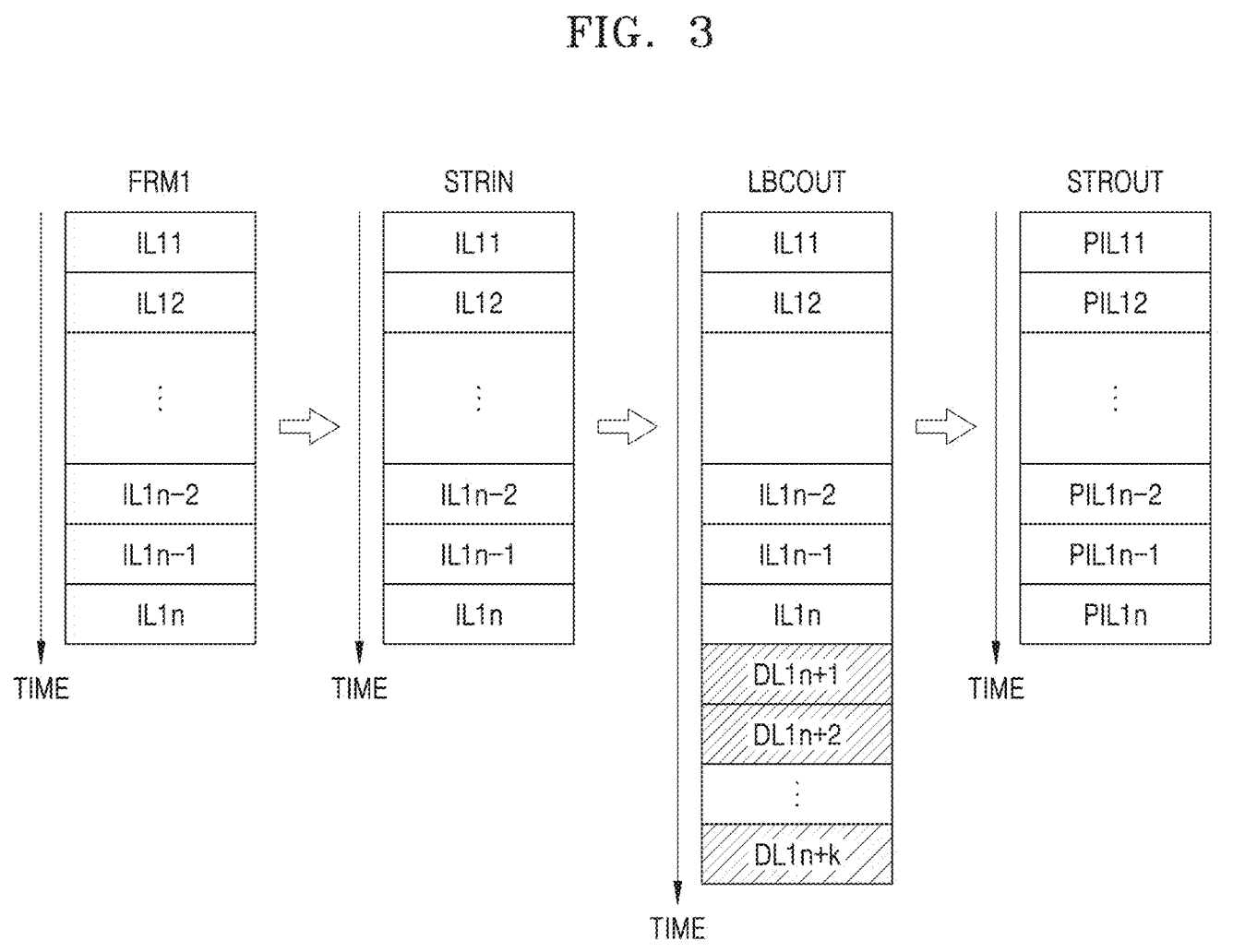

FRM1
IL11
IL12
...
IL1n-2
IL1n-1
IL1n
TIME

STRIN
IL11
IL12
...
IL1n-2
IL1n-1
IL1n
TIME

LBCOUT
IL11
IL12
IL1n-2
IL1n-1
IL1n
DL1n+1
DL1n+2
...
DL1n+k
TIME

STROUT
PIL11
PIL12
...
PIL1n-2
PIL1n-1
PIL1n
TIME

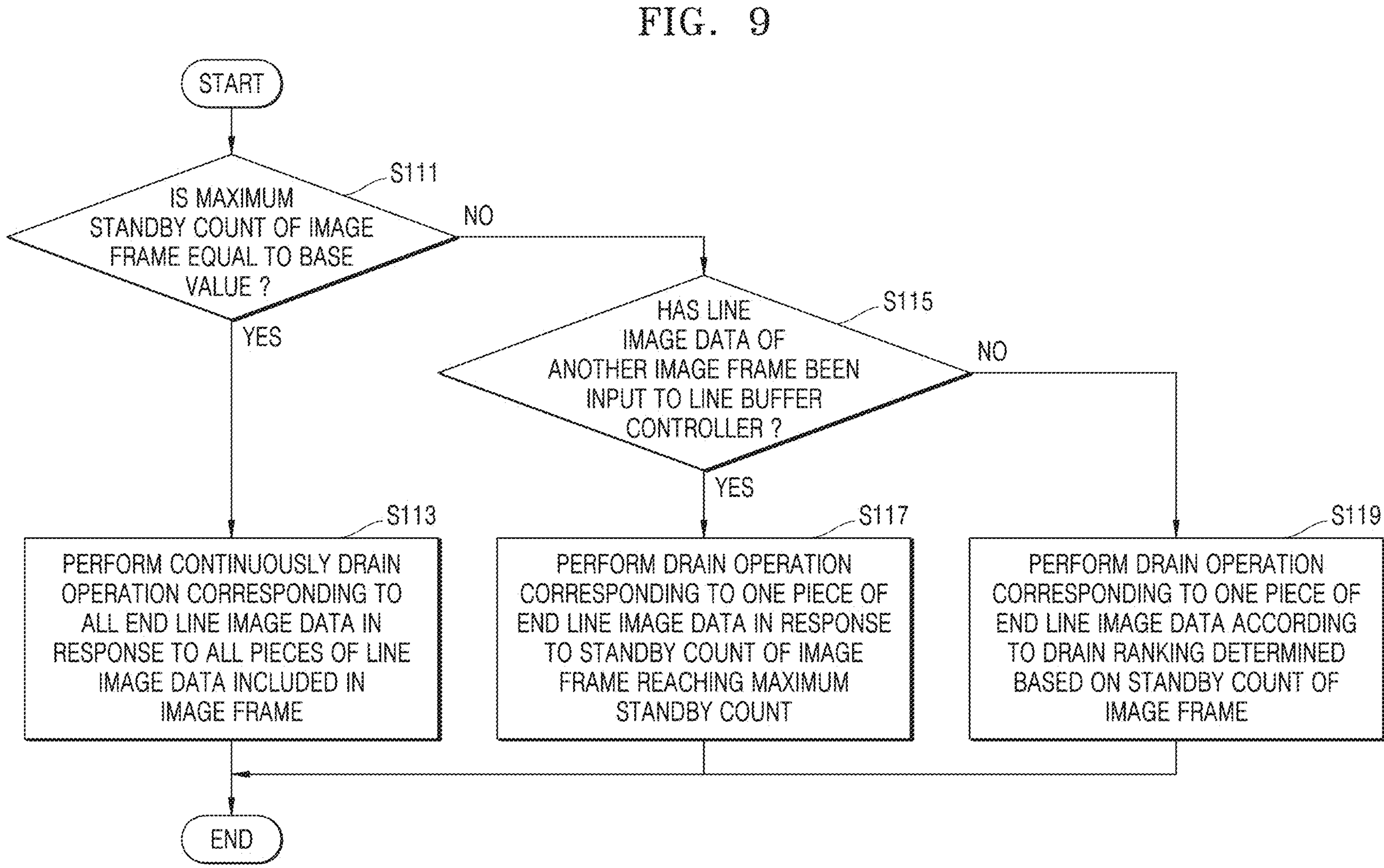
FIG. 9
START
IS MAXIMUM STANDBY COUNT OF IMAGE FRAME EQUAL TO BASE VALUE ?
S111
YES
NO
HAS LINE IMAGE DATA OF ANOTHER IMAGE FRAME BEEN INPUT TO LINE BUFFER CONTROLLER ?
S115
YES
NO
S113
PERFORM CONTINUOUSLY DRAIN OPERATION CORRESPONDING TO ALL END LINE IMAGE DATA IN RESPONSE TO ALL PIECES OF LINE IMAGE DATA INCLUDED IN IMAGE FRAME
S117
PERFORM DRAIN OPERATION CORRESPONDING TO ONE PIECE OF END LINE IMAGE DATA IN RESPONSE TO STANDBY COUNT OF IMAGE FRAME REACHING MAXIMUM STANDBY COUNT
S119
PERFORM DRAIN OPERATION CORRESPONDING TO ONE PIECE OF END LINE IMAGE DATA ACCORDING TO DRAIN RANKING DETERMINED BASED ON STANDBY COUNT OF IMAGE FRAME
END

IMAGE PROCESSING DEVICE AND METHOD OF OPERATION THEREOF

CROSS-REFERENCE TO RELATED APPLICATION

This application claims priority to Korean Patent Application No. 10-2023-0101790, filed on Aug. 3, 2023 in the Korean Intellectual Property office, the disclosure of which is incorporated by reference herein in its entirety.

BACKGROUND

The present disclosure relates to an image processing device including a line buffer controller, and a method of operating the image processing device.

The recent development of mobile devices, such as smartphones and tablet personal computers (PCs), has led to widespread use of electronic devices including a plurality of image sensors within a single device. An image processing device may include an image signal processor (ISP) that interoperates with a plurality of image sensors. To save the installation cost or installation area of a hardware device, ISPs may perform image processing on a plurality of image frames provided from the plurality of image sensors based on a time division multiplexing (TDM) method.

In particular, the structure of an ISP is evolving from a mem-to-mem (M2M) pass structure to an on-the-fly (OTF) pass structure using a line interleaving controller. Accordingly, an image processing device having an OTF pass structure may need various algorithm methods (e.g., a recursive algorithm or an iterative algorithm) to improve image quality of various input image frames obtained via a plurality of channels in the TDM method.

SUMMARY

The present disclosure relates to an image processing device including a line buffer controller configured to prevent data overflow in a line interleaving controller with respect to a plurality of image frames provided from a plurality of image sensors in a time division multiplexing (TDM) method, and to a method of operating the line buffer controller. According to embodiments of the present disclosure, the image processing device enables image processing through various types of algorithm such as a recursive algorithm and an iterative algorithm.

The technical issues of the present disclosure are not limited to the above-mentioned issues, and other technical issues not mentioned above may be clearly understood by one of ordinary skill in the art from the following descriptions.

According to an aspect of the present disclosure, there is provided a method of operating a line buffer controller, the method including receiving line image data included in an image frame; and performing a drain operation on the image frame based on a maximum standby count of the image frame, after the line image data are received.

According to another aspect of the present disclosure, there is provided a line buffer controller configured to: receive line image data included in an image frame, and perform a drain operation on the image frame based on a maximum standby count of the image frame, after the line image data are received.

The line buffer controller is further configured to: based on the maximum standby count of the image frame corresponding to a predetermined base value, and the line image data being received, continuously perform the drain operation on end line image data among the line image data of the image frame.

The line buffer controller is further configured to: based on the maximum standby count of the image frame exceeding a predetermined base value, and a standby count of the image frame reaching the maximum standby count, perform the drain operation on end line image data of the image frame.

According to another aspect of the present disclosure, there is provided an image processing device including a line interleaving controller configured to receive line image data included in a plurality of image frames and output the line image data in a time division multiplexing (TDM) method; a line buffer controller configured to receive first line image data included in a first image frame of the plurality of image frames, and perform a drain operation on the first image frame based on a maximum standby count of the first image frame; and a processor configured to perform image signal process in line units on the first line image data to which the drain operation has been performed by the line buffer controller.

BRIEF DESCRIPTION OF THE DRAWINGS

The above and other aspects and features will be more clearly understood from the following description of embodiments, taken in conjunction with the accompanying drawings in which:

FIG. 1 is a block diagram of an image signal processor according to an embodiment;

FIG. 3 is a diagram of an example of data flow by an image signal processor, according to an embodiment;

FIG. 9 is a flowchart illustrating an operation of a line buffer controller according to an embodiment;

DETAILED DESCRIPTION OF THE EMBODIMENTS

Figure 2A:
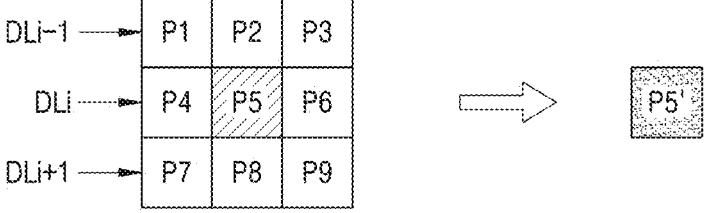
FIGS. 2A and 2B are diagrams for describing delay processing in a line unit of an image signal processor, according to an embodiment.

Hereinafter, embodiments will be described in detail with reference to the accompanying drawings. Embodiments described herein are provided as examples, and thus, the present disclosure is not limited thereto, and may be realized in various other forms. Each embodiment provided in the following description is not excluded from being associated with one or more features of another example or another embodiment also provided herein or not provided herein but consistent with the present disclosure.

Figure 1:
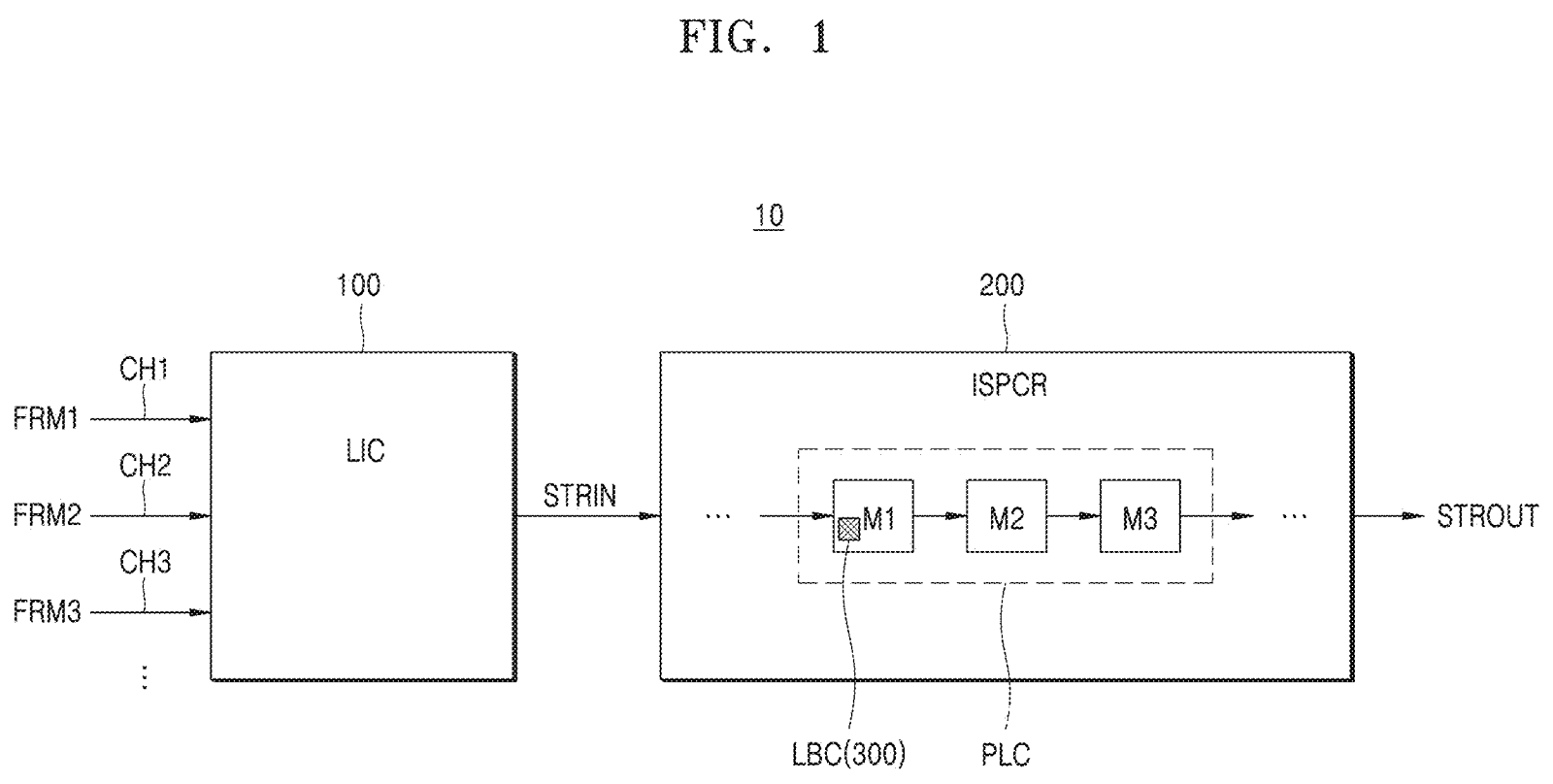

FIG. 1 is a block diagram of an image signal processor (ISP) 10 according to an embodiment.

Referring to FIG. 1, the ISP 10 may include a line interleaving controller (LIC) 100 and an image signal processor core (ISPCR) 200. The ISPCR 200 may include a line buffer controller (LBC) 300.

The LIC 100 may receive line image data included in an image frame, and may sequentially output the line image data to the ISPCR 200 in line units via a time division multiplexing (TDM) method. The line image data may refer to information contained in pixels that constitute a single row or line within the given image frame. For example, the LIC 100 may output the line image data as a single stream signal STRIN. As specifically described with reference to FIG. 3 below, the stream signal STRIN, output by the LIC 100, may sequentially include the line image data. The stream signal STRIN may be provided as an input to the ISPCR 200, and accordingly, hereinafter, the stream signal STRIN output from the LIC 100 may be referred as an input stream signal STRIN.

The LIC 100 may receive a first image frame FRM1, a second image frame FRM2, and a third image frame FRM3 via a first channel CH1, a second channel CH2, and a third channel CH3, respectively. The resolution, frame rate, aspect ratio, codec, compression method, or other attributes of the first image frame FRM1 through the third image frame FRM3 may be individually and independently determined, and may be the same as or different from each other. FIG. 1 illustrates that three image frames are respectively received via three channels, but the LIC 100 may receive corresponding image frames via two or four or more channels. For example, the LIC 100 may receive pieces of first line image data included in the first image frame FRM1 from the first image sensor via the first channel CH1, and may receive pieces of second line image data included in the second image frame FRM2 from the second image sensor via the second channel CH2.

The ISPCR 200 may include one or more pipeline circuits PLC including a first processing circuit M1, a second processing circuit M2, and a third processing circuit M3 connected to each other in series for a sequential processing on the line image data received from the LIC 100. The first processing circuit M1, the second processing circuit M2, and the third processing circuit M3 may be also referred to as modules, and the amount of time or delay introduced by each module may be referred to as a module delay as mentioned in connection with FIG. 4B. In an embodiment, the first processing circuit M1 may need 1-line delay, and a delay size of the ISPCR 200 meaning the number of the delay lines required for processing in the ISPCR 200 may be assumed to be '1'.

The pipeline circuit PLC may divide a process on one piece of line image data into several sub-processes, and the several sub-processes may be respectively performed by the first processing circuit M1 through the third processing circuit M3 having different functions from each other. The result of processes performed by each processing circuit may be transferred continuously to the next processing circuit, and the final pipeline processing result may be output by the last processing circuit. The first through third processing circuits M1 through M3 may perform, in an overlapping manner, each of the sub-processes on the line image data sequentially provided from a previous module (e.g., LBC 300), and accordingly, the entire processing time for the line image data by using the pipeline circuit PLC.

The ISPCR 200 may process one or more pieces of end line image data included in the end portion of the image frame based on the line image data received from the LBC 300. When the LBC 300 of the ISPCR 200 receives all pieces of line image data for one image frame in the input stream signal STRIN, the LBC 300 may perform a drain operation for processing the end line image data included in the end portion of the one image frame. For example, the LBC 300 may generate an additional sync signal for processing (e.g., 3*3 box filtering) of the end line image data of the first image frame FRM1. The LBC 300 may transmit, to the first processing circuit M1, the end line image data of the first image frame FRM1 including the additional line image data generated by copying or mirroring the previous line image data of the end line image data of the first processing circuit M1. To this end, the LBC 300 may include a line drain circuit LDC (FIG. 5) controlling performance of the drain operation. Embodiments of more detailed configurations of the LBC 300 are described below with reference to FIGS. 5 and 6. The first processing circuit M1 of the ISPCR 200 may perform processing (e.g., 3*3 box filtering) on the line image data of the first image frame FRM1 except the end line image data according to an input sync signal of the line image data of the first image frame FRM1, and may perform processing on the end line image data of the first image frame FRM1 according to an additional sync signal. The ISPCR 200 may generate an output stream signal STROUT including the line image data processed by using the other processing circuits (e.g., M2 and M3), and output the output stream signal STROUT.

Figure 2B:
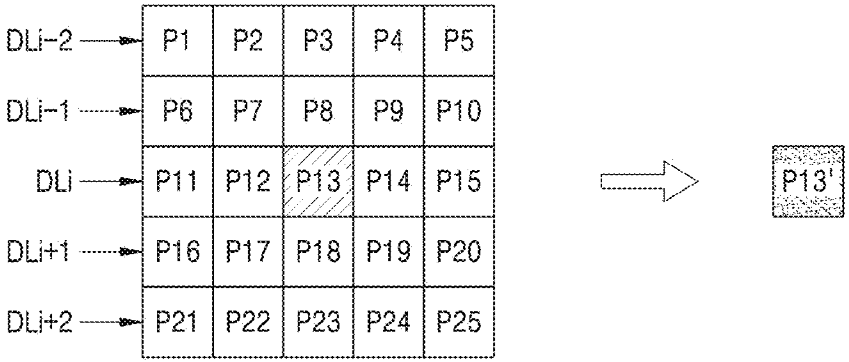

FIGS. 2A and 2B are diagrams for describing delay processing in a line unit of an image signal processor, according to an embodiment.

FIG. 2A illustrates nine pieces of pixel data P1 through P9 that are subject to the 3*3 box filtering among many pieces of pixel data included in a single image frame A processing circuit included in an ISPCR (e.g., the ISPCR 200 in FIG. 1) may obtain processed pixel data piece P5' by processing the pixel data piece P5 at the center by using the pixel data pieces P1 through P4 and P6 through P9 on the periphery.

When processing an image frame provided as line image data in sequential line units, in order to process the pixel data piece P5 within an $i^{th}$ line image data DLi, the processing circuit (e.g., the first processing circuit M1 in FIG. 1) may need the pixel data pieces P1, P2, and P3 within a preceding $(i-1)^{th}$ line image data DLi−1, received prior to the $i^{th}$ line image data DLi, along with the pixel data pieces P7, P8, and P9 within a subsequent $(i+1)^{th}$ line image data DLi+1, received after the $i^{th}$ line image data DLi. In other words, the processing circuit (e.g., the first processing circuit M1 in FIG. 1) may perform a delay filtering operation on the targeted $i^{th}$ line image data (hereafter, $i^{th}$ line image data DLi is referred to as target line image data) DLi based on $(i+1)^{th}$ line image data DLi+1 (hereafter, $(i+1)^{th}$ line image data DLi is referred to as delay line image data) received after the target line image data DLi (i.e., a processing target). In this manner, in the case of 3*3 box filtering, a delay size DSZ indicating the number of pieces of the delay line image data DLi+1 may be 1.

FIG. 2B illustrates twenty five pieces of pixel data P1 through P25 that are subject to 5*5 box filtering among many pieces of pixel data included in a single image frame.

A processing circuit included in an ISPCR (e.g., the ISPCR 200 in FIG. 2) may obtain pixel data piece P13' obtained by processing the pixel data piece P13 at the center by using the pixel data pieces P1 through P12 and P14 through P25 on the periphery.

When processing an image frame provided as line image data in line units, in order to process the pixel data piece P13 of the $i^{th}$ line image data DLi, the processing circuit may need the pixel data pieces P1 through P5 within an $(i-2)^{th}$ line image data DLi−2 and the pixel data pieces P6 through P10 within the $(i-1)^{th}$ line image data DLi−1, received prior to the $i^{th}$ line image data DLi, along with the pixel data pieces P16 through P20 within the $(i+1)^{th}$ line image data DLi+1 and the pixel data pieces P21 through P25 within an $(i+2)^{th}$ line image data DLi+2, received after the $i^{th}$ line image data DLi. In other words, the processing circuit may perform a delay filtering operation on the targeted $i^{th}$ line image data DLi (hereafter, $i^{th}$ line image data DLi is referred to as target line image data) based on two pieces of $(i+1)^{th}$ line image data DLi+1 and $(i+2)^{th}$ line image data DLi+2 (hereafter, $(i+1)^{th}$ line image data DLi+1 and $(i+2)^{th}$ line image data DLi+2 are referred to as delay line image data) received after the target line image data DLi that is a processing target. In this manner, in the case of 5*5 box filtering, the delay size DSZ indicating the number of pieces of the delay line image data DLi+1 and DLi+2 may be 2.

The delay processing in line units and corresponding delay sizes DSZ of the 3*3 box filtering and the 5*5 box filtering have been described with reference to FIGS. 2A and 2B, but the embodiments are not limited thereto. Embodiments may be applied to the delay processing in line units including vertical filtering and box filtering having various window sizes.

FIG. 3 is a diagram of an example of data flow in the ISP 10, according to an embodiment. In FIG. 3, the delay size indicating the number of delay lines required for image processing in the ISP 10 is assumed to be 'k'.

Referring to FIGS. 1 and 3, the first image frame FRM1 may be provided to the ISP 10 via the first channel CH1. The first image frame FRM1 may include pieces of first line image data IL11 through IL1*n*, and the pieces of first line image data IL11 through IL1*n* may be provided to the LIC 100 in line units.

The LIC 100 may sequentially output the pieces of first line image data IL11 through IL1*n* corresponding to the first image frame FRM1 in line units, generate the input stream signal STRIN, and output the input stream signal STRIN to the LBC 300.

The LBC 300 may generate a line buffer controller output signal LBCOUT based on the input stream signal STRIN received from the LIC 100. The LBC 300 may, for delay processing on an at least one piece of end line image data included in the end portion of the first image frame FRM1, perform a drain operation based on the delay size k of the ISP (or the ISPCR) to generate additional line image data DL1*n*+1 through DL1*n*+k. The LBC 300 may output the line buffer controller output signal LBCOUT including the additional line image data DL1*n*+1 through DL1*n*+k as a processing circuit. The additional line image data DL1*n*+1 through DL1*n*+k may be continuously generated, or discontinuously generated according to a maximum standby count of the first image frame FRM1. Details of this issue are described below with reference to FIG. 9.

The processing circuit may perform processings (including a line delay processing) based on the pieces of first line image data IL11 through IL1*n* and pieces of additional line image data DL1*n*+1 through DL1*n*+k, which are included in the line buffer controller output signal LBCOUT, and may sequentially output the processed line image data in line units to generate the output stream signal STROUT including line image data PIL11, PIL12, . . . PILn−2, PILn−1, and PIL1*n*.

Figure 4A:
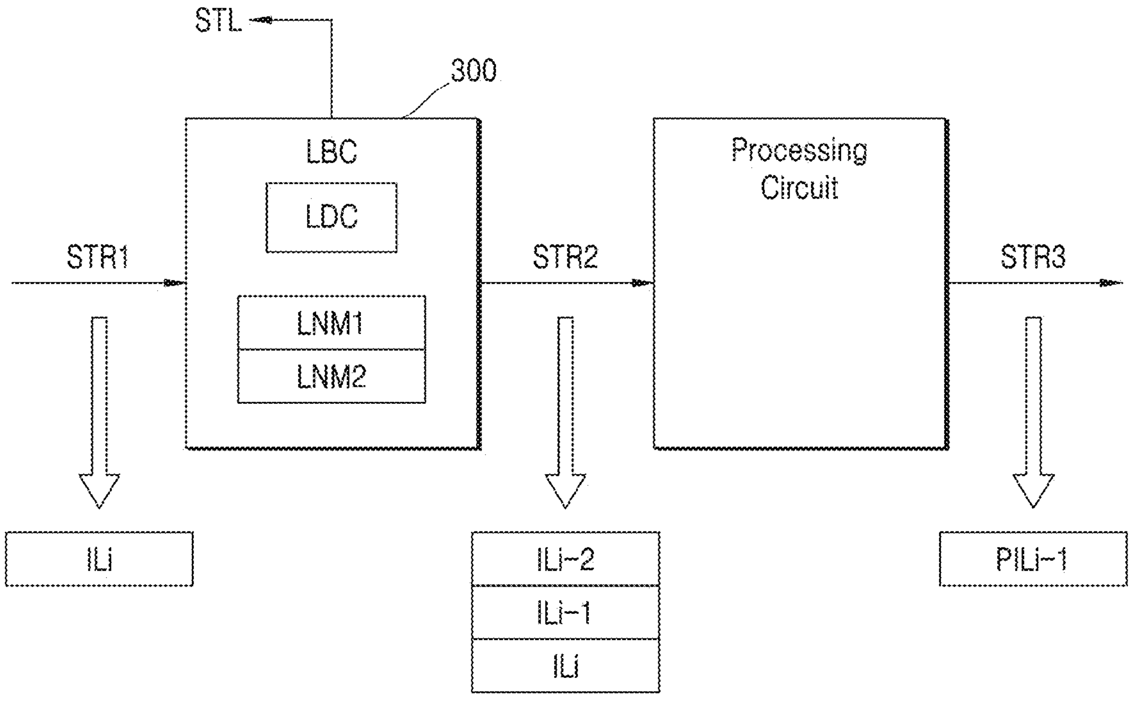
FIG. 4A is a block diagram of an example of an image signal processor, according to an embodiment.

FIG. 4A is a block diagram of an example of the modules included in an ISP (10 of FIG. 1) according to an embodiment. As an example, in FIG. 4A, it is assumed that the processing circuit of the ISP performs 3*3 box filtering, and that the delay size, which means the number of delay lines in the processing circuit, is 1.

Referring to FIG. 4A, the ISP may include the LBC 300 and the processing circuit.

The LBC 300 may buffer the line image data of a first stream signal STR1 input by the front end (e.g., the LIC 100), and output a second stream signal STR2. The processing circuit may perform a processing operation (e.g., filtering) based on the second stream signal STR2, and generate a third stream signal STR3 including the processed line image data.

The LBC 300 may include two line buffers LNM1 and LNM2 storing two pieces of line image data previously received, and the line drain circuit LDC (refer to FIG. 5) controlling a drain operation for processing the end line image data included in the end portion of an image frame.

The LBC 300 may, in synchronization with the $i^{th}$ line image data DLi received via the first stream signal STR1, output simultaneously the $(i-2)^{th}$ line image data DLi−2 and the $(i-1)^{th}$ line image data DLi−1 respectively stored in the line buffers LNM1 and LNM2, and the received $i^{th}$ line image data DLi.

The processing circuit may, based on the $(i-2)^{th}$ line image data DLi−2, the $(i-1)^{th}$ line image data DLi−1, and the $i^{th}$ line image data DLi, output an $(n-1)^{th}$ line image data PLi−1 obtained by processing the 3*3 box filtering operation in pixel units as described with reference to FIG. 2A.

Figure 4B:
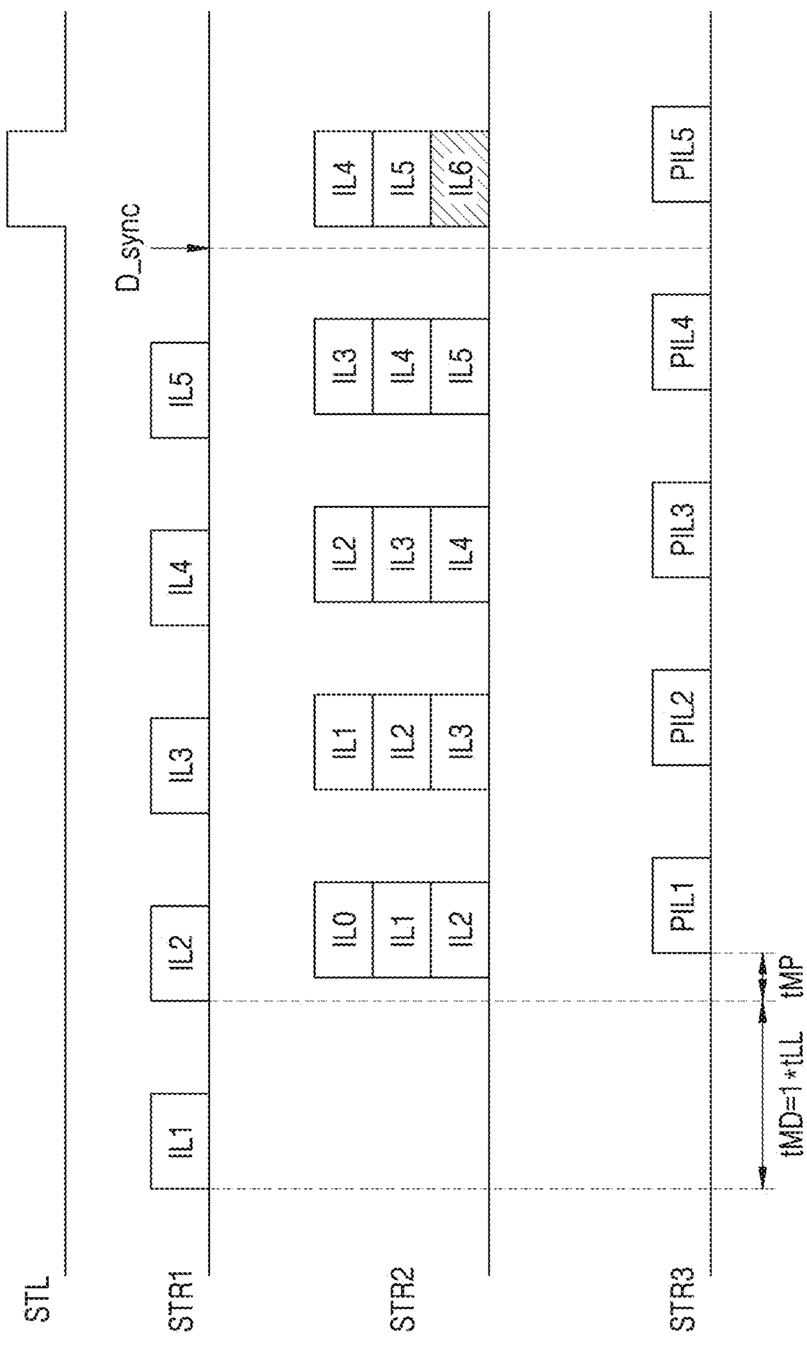
FIG. 4B is a timing diagram of an operation of the image signal processor of FIG. 4A.

FIG. 4B is a timing diagram of an operation of the ISP of FIG. 4A.

In FIG. 4B, it is assumed that an image frame includes five pieces of line image data IL1 through IL5. It is illustrated in FIG. 4B for convenience of descriptions that the image frame includes five pieces of line image data IL1 through IL5, but the embodiment is not limited thereto, and the image frame may include various number of pieces of line image data.

In FIG. 4B, tMD may represent a line delay time of the processing circuit, and tMP may represent a processing time of the processing circuit in FIG. 4A. The line delay time tMD may be expressed as a product of a module delay size MDSZ (=1) and a line time interval tLL.

As illustrated in FIG. 4B, the processing circuit may, in synchronization with the $i^{th}$ line image data ILi received via the first stream signal STR1, perform a delay processing operation (e.g., 3*3 box filtering) on the $(i-1)^{th}$ line image data DLi−1. In this case, because there is no line image data provided via the first stream signal STR1, the delay processing operation on last end line image data IL5 may be performed by using an additional sync signal D_sync and line image data IL6 provided by a drain operation of the line drain circuit LDC. For example, the additional sync signal D_sync may be generated based on an input sync signal of the line image data provided via the first stream signal STR1. The line image data IL6 may be generated by copying or mirroring any one of the previous line image data IL4 or the end line image data IL5.

When the LBC 300 performs a drain operation on the end line image data IL5, the LBC 300 may be in a state in which the line image data is not received from the front end. Accordingly, the LBC 300 may be required to inform the processing circuit of its state of not receiving the current line image data, by activating a stall signal STL.

In this case, when the ISPCR 200 is shared and used in a TDM method in line units, issues may occur. When at the end portion of the image frame, the LBC 300 operates without an input for the line image data having the MDSZ, the stall signal STL may need to be activated to prevent an input of the line image data on other channels into the LBC 300 during the drain operation of the LBC 300. When the stall signal STL is activated, the line image data on other channels may be temporarily stored in a buffer of the LIC 100 controlling an input to the LBC 300. However, when the activation period of the stall signal STL is longer than a threshold period in a limited situation of the buffer capacity of the LIC 100, because the input provided via the channels does not stop, overflow may be caused in the buffer of the LIC 100, and accordingly, a portion of the stored line image data in other channels may be lost. When there are several delay processing circuits in a pipe line of an image processor, this issue may be more complex and unpredictable.

Thus, the embodiments of the present disclosure may provide an image processing device capable of preventing loss in input data due to data overflow in the LIC 100 by minimizing the activation period of the stall signal by using the LBC 300 in a situation, in which the input of a multi-sensor is provided in the TDM method, and capable of performing image processing based on various algorithms including a recursive algorithm, an iterative algorithm, or the like, and a method of operating the image processing device.

Figure 5:
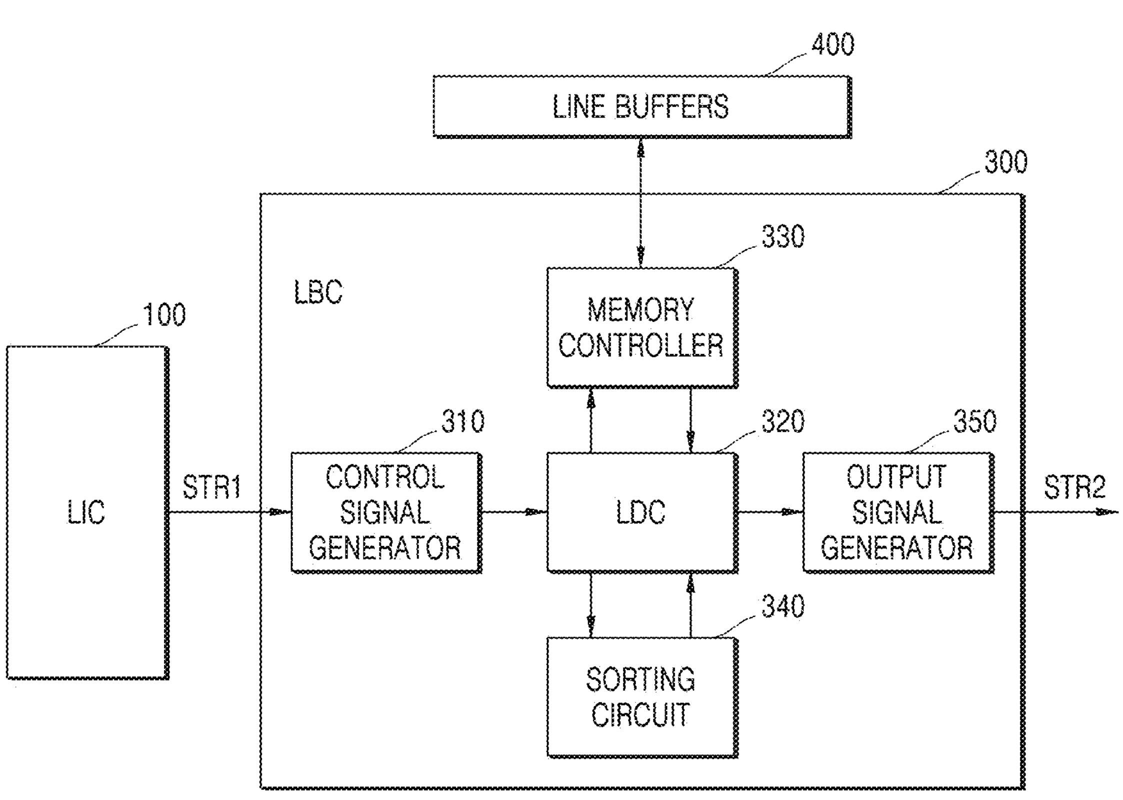
FIG. 5 is a block diagram of a line buffer controller according to an embodiment.

FIG. 5 is a block diagram of the LBC 300 according to an embodiment.

Referring to FIG. 5, the image processing processor according to an embodiment may include the LIC 100, the LBC 300, and line buffers 400.

The LIC 100 may receive pieces of line image data included in an image frame, and sequentially output the pieces of line image data to the LBC 300 in line units based on a TDM method. For example, the LIC 100 may output the pieces of line image data as the first stream signal STR1.

The LBC 300 may include a control signal generator 310, the LDC 320, a memory controller 330, a sorting circuit 340, and an output signal generator 350. The control signal generator 310 and the output signal generator 350 may be also referred to as a control signal generating circuit and an output signal generating circuit, respectively.

Figure 6:
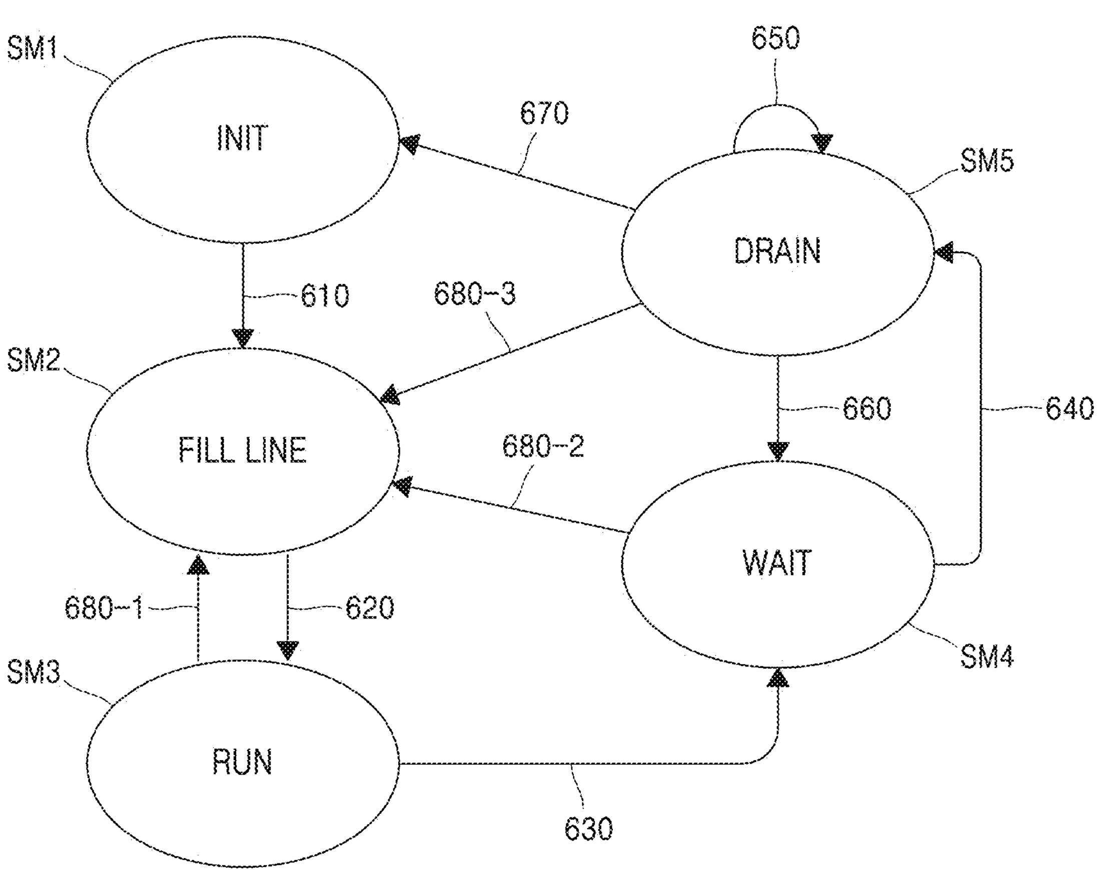
FIG. 6 is a block diagram of state modes of a line buffer controller, according to an embodiment.

The control signal generator 310 of the LBC 300 may generate control signals for controlling a state mode of the LBC 300 illustrated in FIG. 6. The control signal generator 310 may generate a standby count for each of the plurality of image frames input to the LBC 300. In this case, the standby count may represent the number of instances in which the plurality of image frames remain undrained by the LBC 300. The LBC 300 may determine the drain ranking for selecting an image frame to be drained first by comparing the standby count of each of the plurality of image frames.

The LDC 320 may determine and/or change the state mode of the LBC 300. For example, the LDC 320 may include a finite state machine (FSM) circuit for determining/changing the state mode of the LBC 300.

Referring to FIG. 6, the state mode of the LBC 300 may include a first state mode SM1, a second state mode SM2, a third state mode SM3, a fourth state mode SM4, or a fifth state mode SM5. The operation of the LBC 300 in the first through fifth state modes SM1 through SM5 is described below with reference to FIG. 6. The LDC 320 may change the state mode of the LBC 300 according to a predetermined condition based on the input state of the image frame provided to the LBC 300 and the drain state of other image frames, or the like, and may control the drain operation of the LBC 300. The drain operation on the image frame may include an operation of generating additional sync signals for processing the end line image data and additional line image data based on line delay required for the processing of the image frame. The end line image data may mean at least one line image data included in the end portion of the image frame.

The LDC 320 may determine the drain timing of the image frame based on the maximum standby count of the input image frame. The maximum standby count may refer to the maximum number of frames the image signal processor 10 is capable of holding or processing at a given time, and may be determined based on various factors, such as memory space, image format and resolution, and processing capabilities. The maximum standby count may be predetermined and pre-stored in a local memory, or may be determined based on information pre-stored in the local memory. For example, the local memory may include a mapping table indicating a maximum standby count corresponding a specific format or resolution of an image frame. In addition, when a plurality of image frames are input to the LDC 320, the LDC 320 may determine the drain ranking of the plurality of image frames based on alignment information about the standby counts of the plurality of image frames, and may control the state mode of the LBC 300 so that the drain operation on the plurality of image frames is performed according to the determined drain ranking. The drain ranking may refer to the prioritization or sequence in which multiple image frames are processed and drained by the LBC 300. The drain ranking may be determined so that an image frame of the plurality of image frames, having a first standby count that is higher than a second standby count of other image frames, has a greater priority compared to priorities of other image frames. Detailed descriptions of an operation of controlling the state mode of the LBC 300 by the LDC 320 are given below with reference to FIG. 6.

The LDC 320 may store the pieces of line image data included in the first stream signal STR1 received from the LIC 100, in the line buffers 400 via the memory controller 330.

The memory controller 330 may include a circuit for controlling data transmission/reception between the LIC 100 and the line buffers 400. For example, the memory controller 330 may store the input line image data included in the first stream signal STR1, or may perform a control on the line buffers 400 so that the line image data stored in the line buffers 400 is read out to the LDC 320.

When the plurality of image frames are input to the LBC 300, the sorting circuit 340 may compare the standby counts of the plurality of image frames to each other to determine the drain ranking of the plurality of image frames, and may align the plurality of image frames in order of higher standby counts. The sorting circuit 340 may generate data including alignment information about the standby counts of the plurality of image frames, and transmit the data to the LDC 320.

The output signal generator 350 may sequentially output, to the processing circuit, the pieces of line image data received from the line buffers 400 via the LDC 320 and the additional line image data generated as a result of the drain operation on the end line image data of the image frame in the TDM method. For example, the output signal generator 350 may output the generated additional line image data as the second stream signal STR2.

In response to activation of an additional sync signal generated by the LBC 300, the processing circuit may perform a processing operation to generate the third stream signal STR3 based on the second stream signal STR2 received from the LBC 300.

FIG. 6 is a block diagram of state modes of the LBC 300, according to an embodiment.

FIG. 6 is a state diagram of the state modes of the LBC 300 controlled by the LDC 320 in FIG. 5. As an example, the LDC 320 may include the FSM circuit for controlling conversion of the state modes of the LBC 300.

As illustrated in FIG. 6, the LBC 300 may operate in the first state mode SM1, the second state mode SM2, the third state mode SM3, the fourth state mode SM4, or the fifth state mode SM5.

Referring to FIGS. 5 and 6, the first state mode SM1 of the LBC 300 may include an initial operation mode INIT of the LBC 300. For example, the first state mode SM1 may include a state before the LBC 300 receives the image frame from the LIC 100 or a state in which the LBC 300 is reset after the drain operation on the previous image frame is completed. When a frame initiation signal is activated, the LDC 320 may convert the initial operation mode INIT of the LBC 300 into the second state mode SM2 (operation 610).

The second state mode SM2 may include a FILL LINE operation mode of the LBC 300. For example, when the LBC 300 begins to receive the image frame from the LIC 100 and completes receiving (or storing in the line buffer) the line image data by a kernel width, the LDC 320 may convert the mode of the LBC 300 into the third state mode SM3 (operation 620). The kernel width may be determined based on the number of delay lines required for processing the image frame.

The third state mode SM3 may include a RUN operation mode of the LBC 300. For example, when the LBC 300 has received all pieces of line image data included in the image frame after the second state mode SM2 (that is, when receiving the pixel data included in the last line of the image frame is completed), the LDC 320 may convert the mode of LBC 300 into the fourth state mode SM4 (operation 630).

The fourth state mode SM4 may include a WAIT operation mode of the LBC 300. For example, when there is no line image data included in another image frame input to the LBC 300 and the LBC 300 does not perform the drain operation on the other image frame, the LDC 320 may convert the operation mode of the LBC 300 into the fifth state mode SM5 (operation 640). The other image frame may mean an image frame, which has different context from the image frame, and is received via a different channel from the image frame.

When the line image data included in a different image frame is input to the LBC 300, the LDC 320 may maintain the operation mode of the LBC 300 as the fourth state mode SM4, or convert the operation mode of the LBC 300 into the fifth state mode SM5, based on the maximum standby count of the image frame.

In an embodiment, when the line image data included in another image frame is input to the LBC 300, and the maximum standby count of the image frame is a base value (e.g., '0'), the LDC 320 may convert the mode of the LBC 300 into the fifth state mode SM5.

In an embodiment, when the line image data included in another image frame is input to the LBC 300, and the maximum standby count of the image frame exceeds a base value (e.g., '0'), the LDC 320 may maintain the mode of the LBC 300 as the fourth state mode SM4 or convert the mode of the LBC 300 into the fifth state mode SM5. For example, when the standby count has not reached the maximum standby count, the LDC 320 may maintain the mode of the LBC 300 as the fourth state mode SM4. For example, when the standby count has reached the maximum standby count, the LDC 320 may convert the mode of the LBC 300 into the fifth state mode SM5. For example, when the line image data included in another image frame is not input to the LBC 300 even before the standby count of the image frame reaches the maximum standby count, the LDC 320 may convert the mode of the LBC 300 into the fifth state mode SM5 according to the drain ranking of the image frame determined based on the standby count of the image frame. The drain ranking may determine an order, in which a drain operation is performed for the plurality of image frames based on the standby count of the plurality of image frames input to the LBC 300. For example, a drain operation on the image frame having a higher standby count among the plurality of image frames may be performed preferentially.

The fifth state mode SM5 may include a DRAIN operation mode of the LBC 300. The LBC 300 may perform continuously or discontinuously (e.g., intermittently or periodically) the drain operation on the image frame based on the maximum standby count of the image frame. In this case, the LBC 300 may perform the drain operation on the image frame during a period (e.g., a horizontal blank period) after receiving of the end line image data included in the image frame (that is, all pieces of pixel data of the last line of the image frame or the last row of pixels of the image frame) is completed. The LBC 300 may activate the stall signal for preventing an input of the line image data included in another image frame to the LBC 300 while the drain operation is performed.

The LDC 320 may maintain the fifth state mode SM5 while the drain operation on all the pieces of end line image data is performed based on the maximum standby count of the image frame. In addition, the LDC 320 may convert the mode of the LBC 300 to the fourth state mode SM4 for performing the drain operation on the remaining end line image data after the drain operation on the end line image data is performed based on the maximum standby count of the image frame (operation 660). When the drain operation on all the pieces of end line image data included in the image frame is completed, the LDC 320 may convert the mode of the LBC 300 into the first state mode SM1 (operation 670).

In an embodiment, when the maximum standby count of the image frame is a base value (e.g., '0'), the LBC 300 may continuously perform the drain operation on all the pieces of end line image data included in the end portion of the image frame (operation 650). The LBC 300 may continuously perform the drain operation while maintaining the fifth state mode SM5 until the drain operation on all the pieces of end line image data included in the image frame is completed. When the drain operation on all the pieces of end line image data included in the image frame is completed, the LDC 320 may convert the mode of the LBC 300 into the first state mode SM1.

In an embodiment, when the maximum standby count of the image frame exceeds a base value (e.g., '0'), the LBC 300 may discontinuously (e.g., intermittently or periodically) perform the drain operation on the end line image data included in the end portion of the image frame. When the drain operation on all the pieces of end line image data included in the image frame is completed, that is, when the number of all pieces of end line image data is one, the LDC 320 may convert the mode of the LBC 300 into the first state mode SM1 (operation 670), and when the drain operation on all the pieces of end line image data included in the image frame is before completion, that is, when the number of all pieces of end line image data is one or more, the LDC 320 may convert the mode of the LBC 300 into the fourth state mode SM4 (operation 660). The LBC 300 may operate in the fourth state mode SM4 or the fifth state mode SM5 until the drain operation on all the pieces of end line image data included in the image frame is completed.

When a processing on the image frame needs to be performed again due to abnormal operation of an image sensor or the mode of the LBC 300 needs to be reset (e.g., when an input of new image frame starts), the LDC 320 may convert the mode of the LBC 300 from any one mode of the third state mode SM3, the fourth state mode SM4, and the fifth state mode SM5 into the second state mode SM2 (operations 680-1 through 680-3).

The device and method of the embodiments of the present disclosure may prevent data loss due to overflow of the LIC 100 by minimizing the activation period of the stall signal during the processings in the TDM method on the plurality of image frames as the LBC 300 performs the drain operation according to the drain ranking determined based on the maximum standby count and the standby count for each image frame, and as a result, may enable an image processing of high quality by applying, even in a hardware circuit of the OTF structure, various types of image processing algorithms (e.g., Gaussian-Laplacian pyramid algorithm, noise reduction algorithm, color interpolation algorithm, neural network algorithm, etc.).

Figure 7:
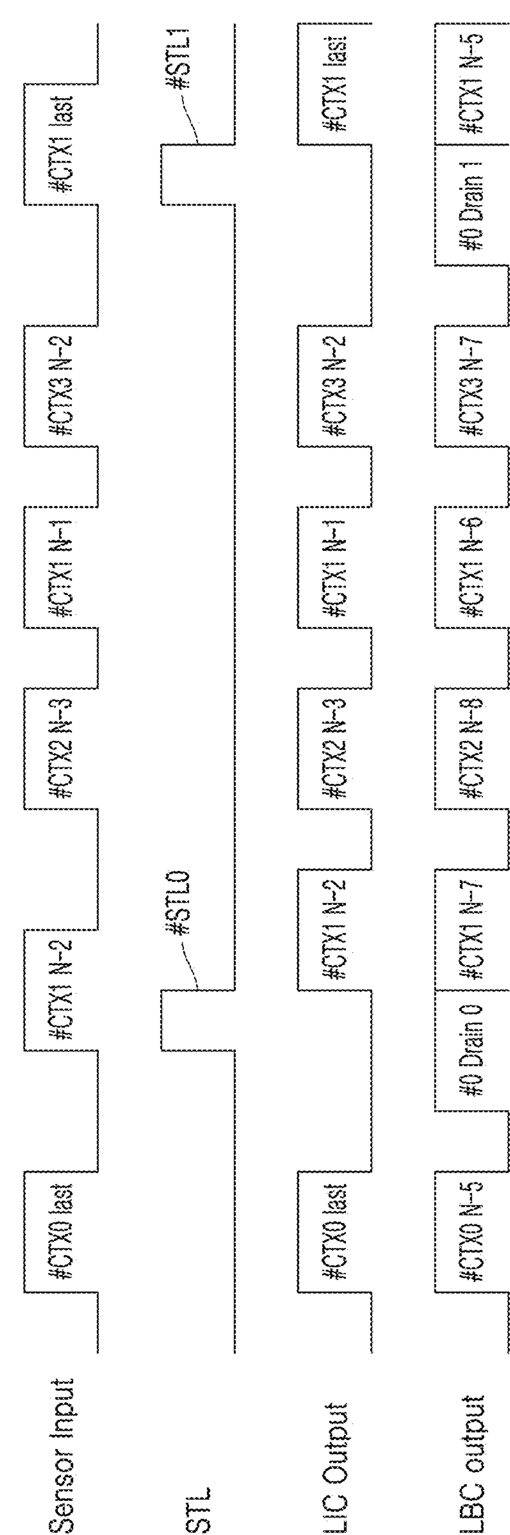
FIG. 7 is a timing diagram illustrating an operation of a line buffer controller, according to an embodiment.

FIG. 7 is a timing diagram illustrating an operation of the LBC 300 according to an embodiment.

FIG. 7 is a diagram for explaining the drain operation of the LBC 300 on a first image frame #CTX0, according to an embodiment. In FIG. 7, the DSZ indicating the number of delay lines required for image processing may be 2, and it is assumed that the maximum standby count of the first image frame #CTX0 is 4 (that is, the maximum standby count is assumed to exceed the base value), and the drain ranking of the first image frame #CTX0 is highest among the plurality of image frames.

In FIG. 7, it is assumed that at least one image processing is performed by transmitting a sensor input to the LIC 100, transmitting an output of the LIC 100 (that is LIC output in FIG. 7) to the LBC 300, and transmitting an output of the LBC 300 (that is LBC output in FIG. 7) to the processing circuit. In this case, the output of the LIC 100 and the output of the LBC 300 may be transmitted to a rear processing circuit in the TDM method.

As illustrated in FIG. 7, sensor inputs may include first end line image data of the first image frame #CTX0 last, first line image data of the second image frame #CTX1 N−2, first line image data of the third image frame #CTX2 N−3, second line image data of the second image frame #CTX1 N−1, first line image data of the fourth image frame #CTX3 N−2, and first end line image data of the second image frame #CTX1 last, and the line image data described above may be output to the LIC 100 in the TDM method.

Referring to FIGS. 6 and 7, when the LBC 300 receives the first end line image data of the first image frame #CTX0 last, the LBC 300 may transmit, to the processing circuit, output data #CTX0 N−5 corresponding to the first end line image data of the first image frame #CTX0 last, and the mode of the LBC 300 may be converted from the third state mode SM3 to the fourth state mode SM4 for a first drain operation on the first image frame #CTX0. Because there is no input of other image frames even before the standby count of the first image frame reaches the maximum standby count or '4', the mode of the LBC 300 may be converted to the fifth state mode SM5, and by performing a first drain operation corresponding to the first end line image data #CTX0 last of the first image frame according to the drain ranking of the first image frame #CTX0, may generate a first additional sync signal and first additional line image data #0 Drain 0 and output them to the processing circuit. By activating a first stall signal #STL0 while performing the first drain operation, the LBC 300 may block receiving the line image data of other image frames. After the first drain operation is performed, the mode of the LBC 300 may be converted from the fifth state mode SM5 to the fourth state mode SM4, for performing the remaining drain operation on the first image frame #CTX0.

In response to receiving the first line image data of the second image frame #CTX1 N−2 from the LIC 100, the LBC 300 may hold a second drain operation on the first image frame #CTX0 and increase the standby count of the first image frame #CTX0 to '1'. The LBC 300 may transmit output data corresponding to first line image data of the second image frame #CTX1 N−2 #CTX1 N−7 to the processing circuit.

In response to receiving first line image data of the third image frame #CTX1 N−3 from the LIC 100, the LBC 300 may hold the second drain operation on the first image frame #CTX0 and increase the standby count of the first image frame #CTX0 to '2'. The LBC 300 may transmit output data corresponding to the first line image data of third image frame #CTX2 N−3 #CTX2 N−8 to the processing circuit.

In response to receiving the second line image data of the second image frame #CTX1 N−1 from the LIC 100, the LBC 300 may hold the second drain operation on the first image frame #CTX0 and increase the standby count of the first image frame #CTX0 to '3'. The LBC 300 may transmit output data corresponding to second line image data of the second image frame #CTX1 N−1 #CTX1 N−6 to the processing circuit.

In response to receiving the first line image data of the fourth image frame #CTX3 N−2 from the LIC 100, the LBC 300 may hold the second drain operation on the first image frame #CTX0 and increase the standby count of the first image frame #CTX0 to '4'. The LBC 300 may transmit output data corresponding to first line image data of the fourth image frame #CTX3 N−2 #CTX3 N−7 to the processing circuit.

Referring to FIGS. 6 and 7, the mode of the LBC 300 may be converted to the fifth state mode SM5 in response to the standby count of the first image frame #CTX0 reaching the maximum standby count. The LBC 300 may perform the second drain operation corresponding to second end line image data of the first image frame #CTX0 last−1 according to the drain ranking of the first image frame #CTX0, and generate a second additional sync signal and second additional line image data #0 Drain 1 and output them to the processing circuit. By activating a second stall signal #STL1 while performing the second drain operation, the LBC 300 may block receiving the line image data of other image frames. The output of the LBC 300 (that is LBC output in FIG. 7) (e.g., output data #CTX0 N−5 and #CTX1 N−5) may be output in the TDM method in line units to the processing circuit.

Figure 8:
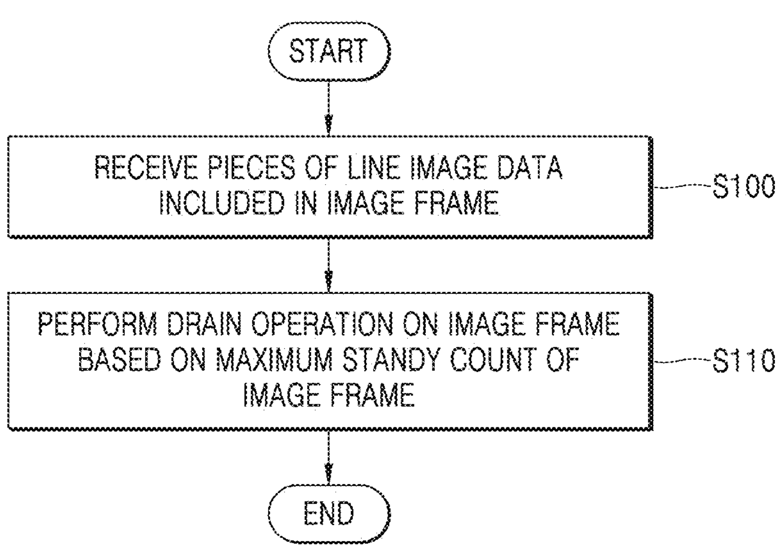
FIG. 8 is a flowchart illustrating an operation of a line buffer controller, according to an embodiment.

FIG. 8 is a flowchart illustrating an operation of the LBC 300, according to an embodiment.

Referring to FIG. 8, an operating method of performing the drain operation on the image frame of the LBC 300 may include operations S100 and S110.

In operation S100, the LBC 300 may receive pieces of line image data included in the image frame. For example, the LBC 300 may receive the line image data included in each of the plurality of image frames from a plurality of sensors via the LIC 100 in the TDM method. For example, as the frame initiation signal is activated, the mode of the LBC 300 may be converted from the first state mode SM1 in FIG. 6 into the second state mode SM2, and when receiving the line image data for the kernel width is completed, the mode of the LBC 300 may be converted from the second state mode SM2 in FIG. 6 into the third state mode SM3. In addition, when all pieces of line image data included in the image frame have been received, that is, when receiving of up to the pixel data included in the last line of the image frame has been completed, the mode of the LBC 300 may be converted from the third state mode SM3 in FIG. 6 into the fourth state mode SM4.

In operation S110, the LBC 300 may perform the drain operation on the image frame based on the maximum standby count of the image frame. For example, the LBC 300 may include an operation of generating additional sync signals and additional line image data based on the line delay required for processing the image frame as the drain operation on the image frame. In the cases of operations S113, S117, and S119 described below, the mode of the LBC 300 may be converted from the fourth state mode SM4 in FIG. 6 into the fifth state mode SM5, and the LBC 300 may perform the drain operation on all the pieces of end line image data included in the image frame or the drain operation on one piece of the end line image data. Details of this issue are described below with reference to FIG. 9.

The LBC 300 may perform the drain operation on the image frame during a period (e.g., a horizontal blank period) after receiving of the end line image data included in the image frame (that is, all pieces of pixel data of the last line included in the image frame) is completed. The LBC 300 may activate the stall signal for preventing an input of the line image data included in another image frame to the LBC 300 while the drain operation is performed.

FIG. 9 is a flowchart illustrating an operation of the LBC 300 according to an embodiment.

FIG. 9 is a diagram describing the drain operation of the LBC 300 based on the maximum standby count of the image frame or the like in operation S110 in FIG. 8. Duplicate descriptions of operations with reference to FIG. 8 with respect to operations in FIG. 9 are replaced with the descriptions with reference to FIG. 8.

Referring to FIG. 9, an operating method of performing the drain operation on the image frame of the LBC 300 may include operations S111 through S119.

In operation S111, the LBC 300 may identify whether the maximum standby count of the image frame is a base value (e.g., a predetermined reference value). In this case, the maximum standby count of the image frame may mean the maximum number of delays of the drain operation on the image frame when the drain operation on the image frame is delayed as the line image data of another image frame is input, and the maximum standby count of the image frame may be set to various values according to the characteristics of the input image frame, the operation environment of the entire image signal processor, or the operation mode of the image signal processor. When the maximum standby count of the image frame is a base value, the LBC 300 may perform operation S113, and when the maximum standby count of the image frame exceeds the base value, the LBC 300 may perform operation S115.

In operation S113, the LBC 300 may continuously perform the drain operation corresponding to all the pieces of end line image data in response to receiving all the pieces of line image data included in the image frame. When the maximum standby count of the image frame is a base value (e.g., '0'), the LBC 300 may continuously perform the drain operation on all the pieces of end line image data included in the end portion of the image frame. The LBC 300 may continuously perform the drain operation while maintaining the fifth state mode SM5 in FIG. 6 until the drain operation on all the pieces of end line image data included in the image frame is completed. When the drain operation on all the pieces of end line image data included in the image frame is completed, the mode of the LBC 300 may be converted into the first state mode SM1 in FIG. 6.

In operation S115, the LBC 300 may identify whether the line image data of another image frame is input to the LBC 300. When the line image data of another image frame is input to LBC 300, the LBC 300 may perform operation S117, and when the line image data of another image frame is not input to LBC 300, the LBC 300 may perform operation S119.

In operation S117, the LBC 300 may perform the drain operation on one piece of end line image data in response to the case in which the standby count of the image frame reaches the maximum standby count. When the standby count of the image frame does not reach the maximum standby count, the mode of the LBC 300 may maintain the fourth state mode SM4 in FIG. 6. When the standby count of the image frame reaches the maximum standby count, the mode of the LBC 300 may be converted from the fourth state mode SM4 to the fifth state mode SM5 in FIG. 6.

In operation S119, the LBC 300 may perform the drain operation corresponding to one piece of end line image data according to the drain ranking determined based on the standby count of the image frame. When the line image data included in another image frame is not input to the LBC 300 even before the standby count of the image frame reaches the maximum standby count, the mode of the LBC 300 may be converted from the fourth state mode SM4 in FIG. 6 into the fifth state mode SM5 according to the drain ranking of the image frame determined based on the standby count of the image frame. In this case, the drain ranking may, as a result of comparing the standby counts of the plurality of image frames, determine an order of performing the drain operation on the plurality of image frames. For example, the drain operation on the image frame having a higher standby count among the plurality of image frames may be performed preferentially by the LBC 300.

When the drain operation on all the pieces of end line image data is completed after operations S117 and S119, the mode of the LBC 300 may be converted from the fifth state mode SM5 to the first state mode SM1 in FIG. 6. However, when the drain operation on all the pieces of end line image data is not completed after operations S117 and S119, the mode of the LBC 300 may be converted from the fifth state mode SM5 to the fourth state mode SM4 in FIG. 6.

Figure 10:
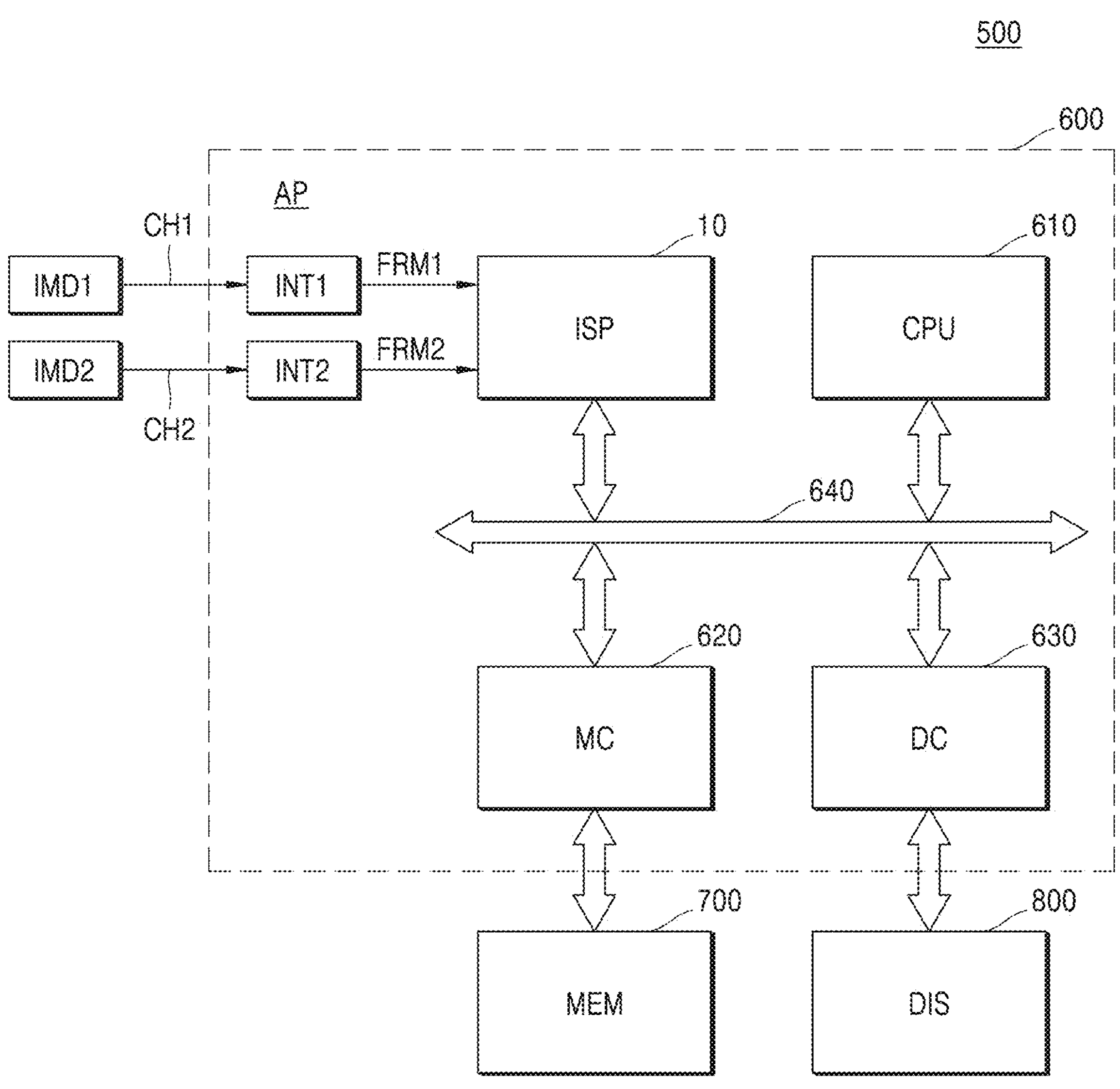
FIG. 10 is a block diagram of a data processing system according to an embodiment.

FIG. 10 is a block diagram of a data processing system 500 according to an embodiment.

Referring to FIG. 10, the data processing system 500 may include an application processor (AP) 600, first and second image devices IMD1 and IMD2, a memory device (MEM) 700, and a display device (DIS) 800.

The data processing system 500 may be implemented as a personal computer or a mobile computing device. The mobile computing device may include a laptop computer, a wearable device, an automotive device, other mechanical devices (e.g., a drone device), etc.

The AP 600 may be implemented as an integrated circuit, a mother board, a system on chip (SoC), or a mobile AP, but is not limited thereto. The AP 600 may include a bus 640, a central processing unit (CPU) 610, first and second interfaces INT1 and INT2, an ISP 10, a memory controller (MC) 620, and a display controller (DC) 630. In FIG. 10, for convenience of description, a plurality of interfaces are illustrated as two interfaces (INT1 and INT2), but the embodiment is not limited thereto, and the AP 600 of the present disclosure may include various number of interfaces according to functions of the AP 600.

The CPU 610, the ISP 100, the MC 620, and the DC 630 may transceive commands and/or data to and from each other via the bus 640.

The bus 640 may be implemented as a bus using an advanced microcontroller bus architecture (AMBA) protocol, an advanced high-performance bus (AHB) protocol, an advanced peripheral bus (APB) protocol, an AMBA extensible interconnect protocol (AXI), or a combination thereof, but is not limited thereto.

The CPU 610 may control the entire operation of the AP 600. For example, the CPU 610 may control the first and second interfaces INT1 and INT2, the ISP 10, the MC 620, the DC 630. The CPU 610 may include one or more cores.

The first interface INT1 may receive first image and first control signals output by a first imaging device IMD1, and may transmit these to the ISP 10. The second interface INT2 may receive second image and second control signals output by a second imaging device IMD2, and may transmit these to the ISP 10. The first image and the second image may mean a picture, image data, an image data stream, or an image frame.

The first imaging device IMD1 and the second imaging device IMD2 may be implemented as a complementary metal-oxide semiconductor (CMOS) image sensor chip or a camera module. Each of the first imaging device IMD1 and the second imaging device IMD2 may transmit image and control signals to the first and second interfaces INT1 and INT2 via a mobile industry processor interface (MIPI)® camera serial interface (CSI). For example, the resolution and/or the first frame rates of the first image and the second image may be different from each other.

The ISP 10 may perform TDM on the first and/or second image in units of line data, not in units of frame data, without using the MEM 700 in the outside.

For example, the ISP 10 may process images output by the first and second imaging devices IMD1 and IMD2 on-the-fly in line units according to the TDM method. According to embodiments of the present disclosure, the ISP 10 may include a line buffer controller performing the drain operation according to the maximum standby count of the image frame or the standby count of the image frame, and an image signal processor core processing one or more pieces of the end line image data included in the end portion of the image frame in synchronization with an additional sync signal generated by the drain operation.

For example, the image signal processor core may perform at least one of auto dark level compensation, bad pixel replacement, noise reduction, lens shading compensation, color correction, RGB gamma correction, edge enhancement, hue control, and color suppress. In addition, the image signal processor core may perform image processing, to which at least one of a recursive algorithm or an iterative algorithm (e.g., a Gaussian-Laplacian pyramid algorithm, a noise reduction algorithm, a color interpolation algorithm, or a neural network algorithm, or the like) is applied.

According to the control by the CPU 610, the MC 620 may store, in the MEM 700, data processed in line units according to the TDM method by the ISP 10. The DC 630 may, according to the control by the CPU 610, transmit data (e.g., the image frame) output by the MEM 700 to a display device (DIS) 800. For example, the DC 630 may transmit, to the DIS 800, data output by the MEM 700 via an MIPI® display serial interface (DSI), a display port (DP), or an embedded display port (eDP).

Figure 11:
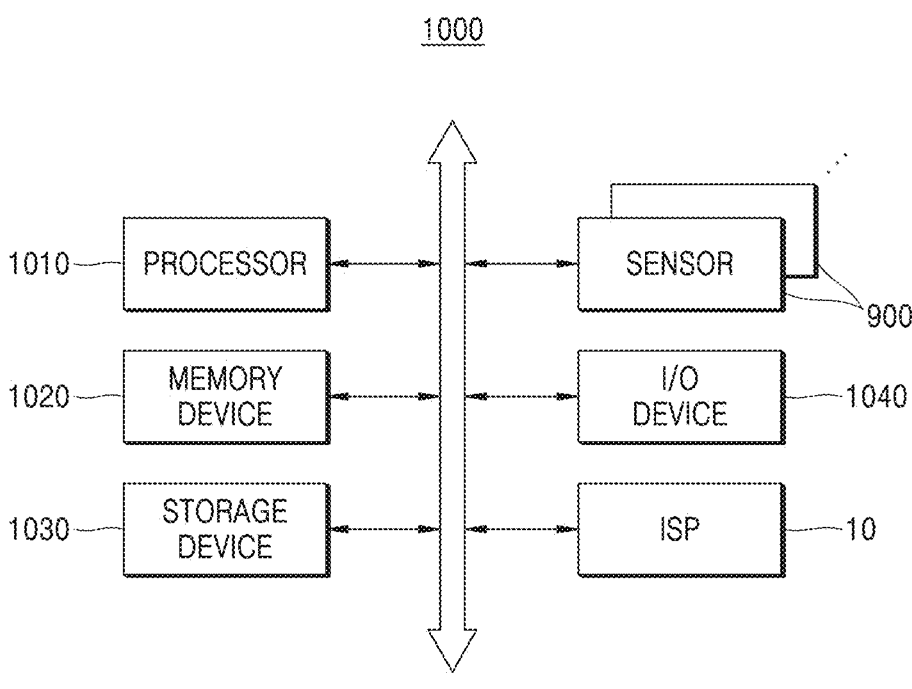
FIG. 11 is a block diagram of a computing system according to an embodiment.

FIG. 11 is a block diagram of a computing system 1000 according to an embodiment.

Referring to FIG. 11, the computing system 1000 may include a processor 1010, a memory device 1020, a storage device 1030, the input/output (I/O) device 1040, the ISP 10, and a plurality of image sensors 900. The computing system 1000 may further include ports capable of communicating with a video card, a sound card, a memory card, a universal serial bus (USB) device, and the like, or communicating with other electronic devices.

The processor 1010 may perform particular calculations or tasks. According to an embodiment, the processor 1010 may be a micro-processor or a CPU. The memory device 1020 may store data required for an operation of the computing system 1000. For example, the memory device 1020 may be implemented as a dynamic RAM (DRAM), a mobile DRAM, a static RAM (SRAM), the PRAM, a ferroelectric RAM (FRAM), the RRAM, and/or the MRAM. The storage device 1030 may include solid state drive, a hard disk drive, a CD-ROM, etc. The I/O device 1040 may include input tools, such as a keyboard, a keypad, and a mouse, and output tools, such as a printer, and a display.

As described above, the ISP 10 may include a line buffer controller which performs the drain operation on the image frame according to the maximum standby count or standby count of the image frame. The line buffer controller may effectively prevent interference between channels by providing the image signal processor core including a pipeline structure by generating internally additional sync signals and additional line image data for processing the all pieces of end line image data included in the end portion of the image frame provided by the plurality of image sensors 900 based on the maximum standby count or the standby count of the image frame, and may perform image processing by using various algorithm (e.g., the recursive algorithm or the iterative algorithm).

Embodiments of the present disclosure may be usefully used in a device requiring processing of an image signal and a system including the device.

In particular, the embodiments of the present disclosure may be usefully applied to various types of computing systems including an image sensor and an image processing system, such as an electronic devices, such as a computer, a laptop, a cellular phone, a smart phone, an MP3 player, a personal digital assistant (PDA), a portable multimedia player (PMP), a digital TV, a digital camera, a portable game console, a navigation device, a wearable device, an internet of things (IoT) device, an internet of everything (IoE) device, an e-book, a virtual player (VR), and an augmented reality (AR) device, an in-vehicle infotainment (IVI) system, and a drone.

In addition, the embodiments of the present disclosure may be usefully applied to various types of image processing systems (e.g., a microcontroller unit (MCU), or the like) including a module or circuit processing image data output by a plurality of sensors in the TDM method (e.g., a TDM generator and a state machine circuit for the TDM generator, or the like).

While the present disclosure has been particularly shown and described with reference to embodiments thereof, it will be understood that various changes in form and details may be made therein without departing from the spirit and scope of the following claims.

What is claimed is:

1. A method of operating a line buffer controller, the method comprising:

receiving line image data included in an image frame; and performing a drain operation on the image frame based on a maximum standby count of the image frame, after the line image data are received wherein the performing of the drain operation comprises:

based on the maximum standby count of the image frame corresponding to a predetermined base value, and the line image data being received, continuously performing the drain operation on end line image data of the image frame.

2. The method of claim 1, wherein the performing of the drain operation comprises:

for processing the end line image data among the line image data of the image frame, generating a sync signal and additional line image data based on line delay required for processing the image frame.

3. The method of claim 1, wherein the performing of the drain operation comprises:

based on the maximum standby count of the image frame exceeding the predetermined base value, and a standby count of the image frame reaching the maximum standby count, performing the drain operation on a piece of end line image data among the line image data of the image frame.

4. The method of claim 3, wherein the performing of the drain operation further comprises:

determining a drain ranking by comparing standby counts of a plurality of image frames including the image frame, wherein the drain ranking is determined so that an image frame of the plurality of image frames, having a first standby count that is higher than a second standby count of other image frames, has a greater priority compared to priorities of other image frames.

5. The method of claim 3, wherein the performing of the drain operation further comprises:

when the line image data of another image frame has not been received before the standby count of the image frame reaches the maximum standby count, performing the drain operation on the piece of the end line image data according to a drain ranking of the image frame.

6. The method of claim 5, wherein the performing of the drain operation further comprises:

resetting the standby count of the image frame after the drain operation is performed on the piece of end line image data;

recounting the standby count of the image frame with respect to another piece of the end line image data of the image frame; and performing the drain operation on the other piece of the end line image data based on the recounted standby count of the image frame reaching the maximum standby count.

7. The method of claim 1, further comprising:

activating a stall signal while the line buffer controller performs the drain operation on the image frame, to prevent an input of the line image data included in another image frame during the drain operation on the image frame.

8. A line buffer controller configured to:

receive line image data included in an image frame, and perform a drain operation on the image frame based on a maximum standby count of the image frame, after the line image data are received wherein the line buffer controller further configured to:

based on the maximum standby count of the image frame exceeding a predetermined base value, and a standby count of the image frame reaching the maximum standby count, perform the drain operation on end line image data of the image frame.

9. The line buffer controller of claim 8, further configured to:

generate, for processing the end line image data among the line image data of the image frame, a sync signal and additional line image data based on line delay required for processing the image frame.

10. The line buffer controller of claim 8, further configured to:

based on the maximum standby count of the image frame corresponding to the predetermined base value, and the line image data being received, continuously perform the drain operation on the end line image data among the line image data of the image frame.

11. The line buffer controller of claim 8, further comprising a control signal generating circuit and a sorting circuit, wherein the control signal generating circuit is configured to count the standby count of the image frame, and the sorting circuit is configured to determine a drain ranking by comparing standby counts of a plurality of image frames including the image frame, and wherein the drain ranking is determined so that an image frame having a higher standby count among the plurality of image frames has a greater priority compared to other image frames.

12. The line buffer controller of claim 11, wherein the image frame and the end line image data correspond to a first image frame and first end line image data, respectively, wherein, when second line image data of a second image frame is not received before the standby count of the first image frame reaches the maximum standby count, the drain operation corresponding to the first end line image data is performed according to the drain ranking of the first image frame, and wherein the second image frame means a different frame from the first image frame.

13. The line buffer controller of claim 12, wherein the control signal generating circuit is further configured to:

reset the standby count of the first image frame after the drain operation is performed on the first end line image data is performed, and recount the standby count of the first image frame for the second line image data included in the first image frame, wherein the drain operation is performed on second end line image data based on the recounted standby count reaching the maximum standby count, or wherein, based on the second line image data of the second image frame not being received before the recounted standby count reaches the maximum standby count, the drain operation is performed on the second end line image data according to the second end line image data determined as the counted standby count.

14. The line buffer controller of claim 8, wherein the image frame and the end line image data correspond to a first image frame and first end line image data, respectively, and wherein a stall signal is activated while the drain operation is performed on the first image frame, to prevent an input of second line image data included in a second image frame during the drain operation on the first image frame.

15. The line buffer controller of claim 14, wherein the first line image data of the first image frame and the second line image data of the second image frame are received based on a time division multiplexing (TDM) method.

16. The line buffer controller of claim 14, wherein the second image frame comprises an image frame in which any one of a Gaussian-Laplacian pyramid algorithm, a noise reduction algorithm, a color interpolation algorithm, and a neural network algorithm is applied to the first image frame.

17. An image processing device comprising:

a line interleaving controller configured to receive line image data included in a plurality of image frames and output the line image data in a time division multiplexing (TDM) method;

a line buffer controller configured to receive first line image data included in a first image frame of the plurality of image frames, and perform a drain operation on the first image frame based on a maximum standby count of the first image frame; and a processor configured to perform image signal process in line units on the first line image data to which the drain operation has been performed by the line buffer controller wherein the line buffer controller is further configured to:

for processing first end line image data among the first line image data of the first image frame, generate a sync signal and first additional line image data based on line delay required for processing the first image frame.

18. The image processing device of claim 17, wherein the line buffer controller is further configured to:

based on the maximum standby count of the first image frame corresponding to a predetermined base value, perform the drain operation corresponding to at least one piece of first end line image data included in an end portion of the first image frame, or based on the maximum standby count exceeding the predetermined base value, and a standby count of the first image frame reaching the maximum standby count, perform the drain operation corresponding to the at least one piece of first end line image data of the first image frame.

* * * * *